Nov. 17, 1931.   G. SOMAJNI   1,832,146

ELECTRIC CONTROL APPARATUS

Filed Sept. 9, 1925

G. Somajni
INVENTOR

By: Marks & Clerk
ATTYS.

Patented Nov. 17, 1931

1,832,146

UNITED STATES PATENT OFFICE

GIACOMO SOMAJNI, OF MILAN, ITALY

ELECTRIC CONTROL APPARATUS

Application filed September 9, 1925, Serial No. 55,299, and in Italy September 23, 1924.

The present invention is directed to improvements in electro-magnetic switches.

The invention has for its object to obviate the drawbacks which the apparatus of this type have in their operation which could not be determined in some cases or which was affected by the oscillations of the movable member controlled by the antagonistic electromagnets. Finally, in order to obviate these drawbacks it is therefore necessary to adopt suitable arrangements for ensuring a prompt, reliable, and decisive operation.

The movable member must be subject to a directing action which is exerted by the effect of gravity or by a suitable system of springs and returns the said member to its position of rest when the electric actions cease. However, when the electrodynamic actions of the electromagnets are effective the result of the said directing action must be such that the operation of the electromagnets is not affected and the apparatus is permitted to operate practically in accordance with the relations established between the aforesaid two antagonistic electro-dynamic actions. Consequently, as soon as each of the electromagnets enters into action, it must exert a considerable attraction on the movable member independently of the position occupied by the said member and of the movements made by the latter; however, when the two electromagnets enter into antagonistic action, the two attractions must be practically balanced so as to leave the sole directing action efficacious which tends to maintain and to return the movable member to its position of rest.

A powerful and increasing action must be developed by each of the electromagnets when its action becomes preponderant so that the movable member is displaced and remains attracted by the prevailing electromagnet without oscillation until the other electromagnet prevails in its turn.

The members effecting the commutation are mounted on an oscillating lever and they lead to the result that the armatures, which are also mounted on the same lever, are subjected to the action of the corresponding elec50 tromagnets. Each of these armatures has a projection which forms a gap of variable thickness with the flank of its electromagnet which may be introduced in a wide gap formed in the electromagnet.

These projections are fashioned and arranged in such a manner that in a remote position the end of the projection is situated exactly at the entrance of one of the said wide gaps between the two members of the horseshoe cores of the said electromagnets. When the armature is attracted towards the electromagnet, its corresponding projection enters the said gap which it almost completely occupies while leaving on its two sides two very small gaps; when finally the armature has reached its final position of attraction, a portion of the gap between the members of the electromagnet core again remains empty beyond the corresponding projection. It is possible to demonstrate by calculation and to verify by experience that if the lateral gaps remaining on the two flanks of the projection have a very small thickness with regard to the total gap existing between the members of the electromagnet core, then the value of the attraction acting on each projection is greatly increased and it remains practically constant in all the positions which this projection may assume in accordance with the various positions of the armature with which it is integral and moreover this attraction is greater when the armature occupies its position which is more remote from the electromagnet. It follows therefrom that the presence of the projections thus fashioned and arranged ensures a considerable attractive force on the remote armature, this force remaining constant during the approaching movement with a slight tendency to diminish.

Moreover, the movable members integral with the commutating members have the said two well developed flanks opposite the surfaces suitably formed on the pole pieces of the electromagnets. Between each of these flanks and the corresponding pole piece there exists a gap which is wide when the armature is remote from the electromagnet and greatly reduced when it is approached by the same; this gap varies quickly in proportion as the armature is displaced opposite the said corresponding electromagnet. Consequently, the attraction acting on each of the flanks is very slight in the remote position and increases quickly during its course of approach in order to become extreme at the end of this course.

The result of these two attractions is consequently already extreme when the armature is in its remotest position from the corresponding electromagnet on account of the projection and increases during the course of approach so that in all positions of the movable lever its value is very high from the beginning and always of a high order with regard to the directing action.

Further features of the invention will be described with reference to the accompanying drawings in which:—

Figure 1:
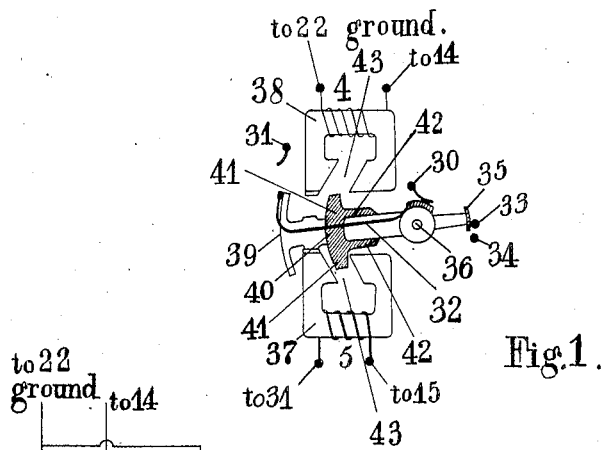
Figure 1 is a detail of a preferred form.

The switch consists of contacts 30 and 31, an armature 32 and opposed shunts and series coils 4 and 5. The terminal 31 of the armature is connected to the series coil 5, and one end of the switch coil 4 is grounded as at 22.

The conducting part 32 is mounted on an arm or lever 39 pivoted at 36 and carrying near its middle an iron armature 40. This armature comprises two more or less vertical projections 41 and two horizontal portions 42. The vertical projections 41 are adapted to slide within air gaps 43 in upper and lower electromagnets 38, 37 which are energized respectively by the coils 4 and 5 also shown in Figure 1.

The tractive force exercised on the projections 41 by the corresponding electromagnets is kept almost constant in all positions of the armature by so dimensioning the iron circuit of the electromagnets that even in the limiting upward and downward positions of the projections 41 the iron is not saturated.

The tractive force on the projections 41, however, increases rapidly as they approach their respective magnets.

If, therefore, both the magnets are energized when the arm 39 is in its lower position the said arm will commence to rise when the tractive force of the upper electromagnet 38 predominates and will accelerate rapidly until it comes to rest against the upper magnet.

As will be seen in Figure 1, the arm 39 has beyond the pivot 36 a short tail portion which connects or disconnects contacts 33 and 34 by means of the conducting piece 35 according to whether the arm is in its upper or lower positions respectively. The purpose of this device will be explained with regard to the arrangement of Figure 2.

Figure 2:
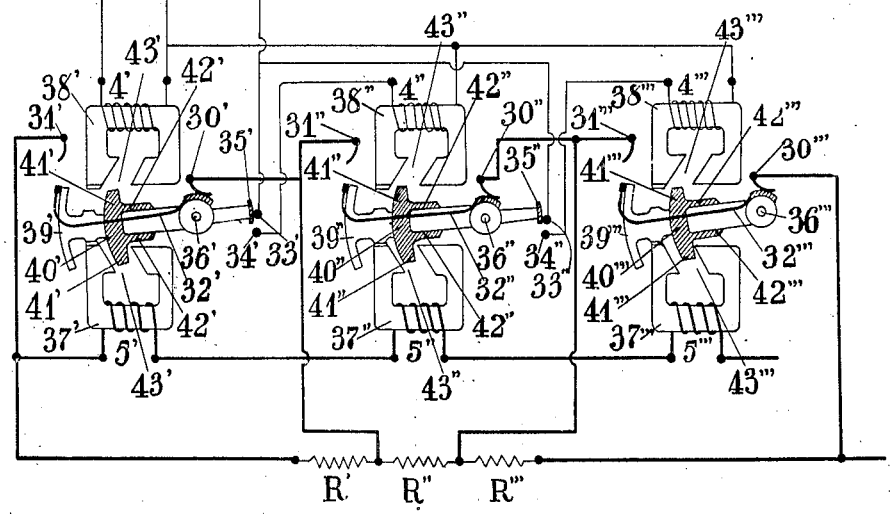
Figure 2 is a diagrammatic representation of a kind of cascade arrangement of switches for short circuiting a resistance section by section.

Figure 2 shows three switches, similar in construction to that already described with reference to Figure 1 except for the fact that the last relay has no tail and contact 35.

The same reference figures have been used for all three relays with distinguishing dashes.

The connections are as follows:—

The three coils 5', 5'' and 5''' are connected in series between the contact 15 on a controller, not shown, and the common junction of the contact 31' and the end of R'. The contact 30' is connected to 31'' and to the common junction of R' and R''.

Contact 30'' is connected to 31''' and the common junction of R'' and R'''.

Contact 30''' is connected to the remaining end of R'''.

The coil 4' is connected across the terminals 22 and 14 as in Figures 1 and 2 and by means of the tail ends of the arms 39' and 39'' the coils 4'' and 4''' are connected in sequence across the same terminals, viz. 22, or ground and 14 when the arms 39' and 39'' rise in sequence and connect successively 33' to 34' and 33'' to 34''.

In operation the first switch operates and short circuits in due course the resistance R'; at the same time the coil 4'' is energized by the completion of the circuit through 33' and 34' and the second relay operates to short circuit the resistance R'' and energize in turn the coil 4''' of the third relay which thereupon short circuits the remaining resistance R'''.

Having now described my invention, what I claim as new and desire to secure by Letters Patent is:—

An electromagnetic switch comprising a pivotally mounted armature having contacts thereon, said armature having a pair of oppositely extending projections carried thereby, a pair of spaced cores each having a gap positioned in operative relation to said projections, an operating winding on one of said cores for attracting one of said projections into one of the gaps, a restraining winding on the other core for holding the other projection in said gap until the current in said winding drops to a predetermined value.

Signed at Milan, Italy, this 25th day of August, 1925.

GIACOMO SOMAJNI.